Figure 1:
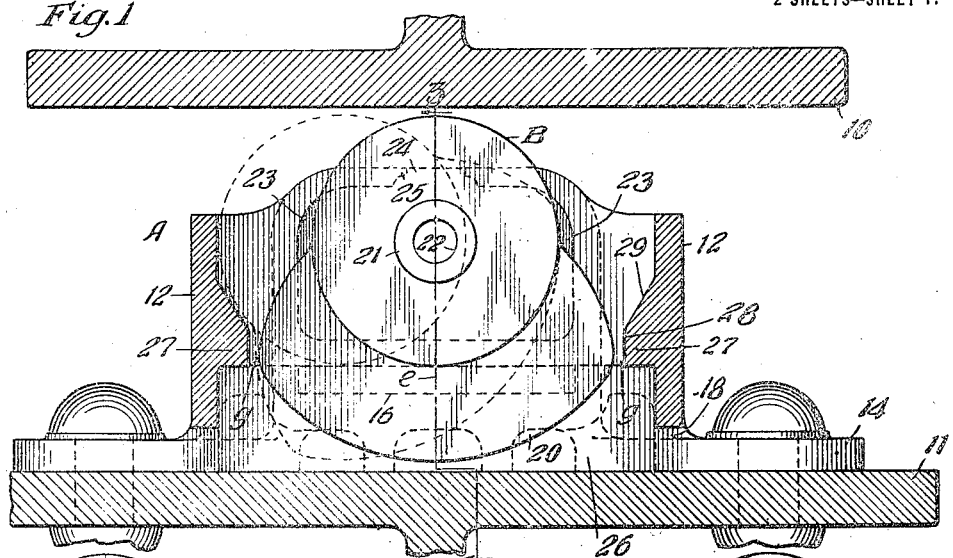

G. A. JOHNSON.
GRAVITY SELF CENTERING ROLLER BEARING.
APPLICATION FILED JAN. 13, 1919.

1,317,792.

Patented Oct. 7, 1919.
2 SHEETS—SHEET 1.

WITNESSES:

INVENTOR.
George A Johnson
BY George J. Haight
ATTORNEY

G. A. JOHNSON.
GRAVITY SELF CENTERING ROLLER BEARING.
APPLICATION FILED JAN. 13, 1919.
1,317,792. Patented Oct. 7, 1919.
2 SHEETS—SHEET 2.
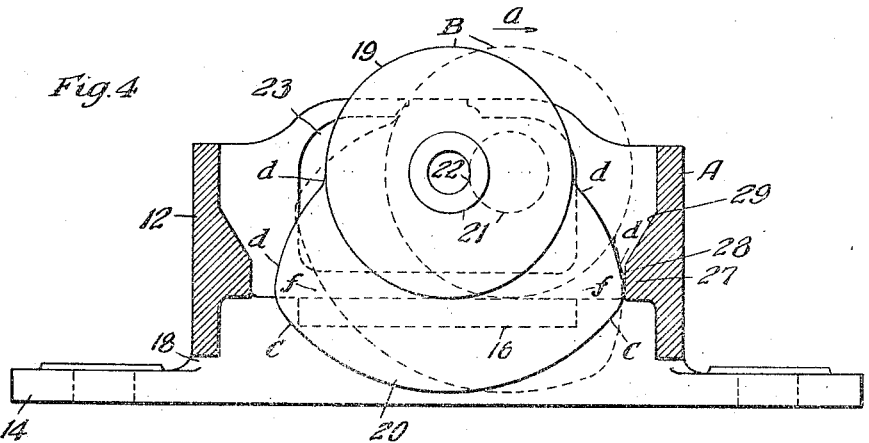
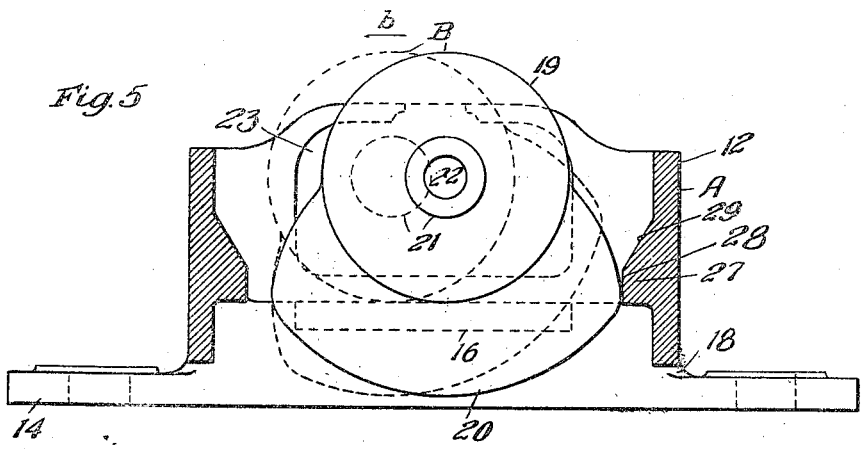
WITNESSES:
Wm. Geiger
INVENTOR.
George A. Johnson
BY George I. Haight
his ATTORNEY

UNITED STATES PATENT OFFICE.

GEORGE A. JOHNSON, OF CHICAGO, ILLINOIS, ASSIGNOR TO WILLIAM H. MINER, OF CHAZY, NEW YORK.

GRAVITY SELF-CENTERING ROLLER-BEARING.

1,317,792.  Specification of Letters Patent.  Patented Oct. 7, 1919.

Application filed January 13, 1919. Serial No. 270,771.

*To all whom it may concern:*

Be it known that I, GEORGE A. JOHNSON, a citizen of the United States, residing at Chicago, in the county of Cook and State of Illinois, have invented a certain new and useful Improvement in Gravity Self-Centering Roller-Bearings, of which the following is a full, clear, concise, and exact description, reference being had to the accompanying drawings, forming a part of this specification.

This invention relates to improvements in gravity self-centering roller bearings.

One object of this invention is to provide a simple, practical, and relatively inexpensive roller bearing especially adapted for railway car side bearings and wherein is employed a minimum number of parts with a true anti-friction roller that is self-centering under the influence of gravity and without the aid of springs or other parts likely to get out of order.

Another object of the invention is to provide an anti-friction roller side bearing for railway cars wherein is employed a true cylindrical anti-friction roller and possessing all the usual advantages of the true cylindrical roller bearing combined with the self-centering advantages of the ordinary type of rocker side bearing but without the disadvantages usually accompanying either of said types of bearings.

Another object of the invention is to provide an anti-friction self-centering roller bearing wherein the anti-friction roller and the casing in which it is mounted are provided with coöperating means to positively limit to a predetermined small amount the maximum degree to which the anti-friction element can be shifted by jarring or otherwise from its central normal position and in such manner as to leave the anti-friction element, even when offset to the maximum degree, in a position where it will properly function in either direction.

Other objects of the invention will more fully appear from the description hereinafter following.

In the art of anti-friction bearings, and more particularly side bearings for railway cars, many efforts have been made to provide an anti-friction bearing to be interposed between the body and truck bolsters of a car so designed that the anti-friction element will maintain a uniform distance between the opposed bearing surfaces of the bolsters during the actuation of the bearing and at the same time have the anti-friction element adapted to return to normal position after the removal of the actuating force or pressure. With a true cylindrical anti-friction roller, it has heretofore been customary to provide some additional means for returning the roller to central normal position since a true cylindrical roller cannot be permitted to rise up inclined tracks because of the necessity of maintaining uniform height for the contacting bearing surface of the roller. Such additional means have generally included a spring or plurality of springs arranged in a great variety of ways and it is evident that such springs will ordinarily constitute the weakest element of the bearing and thereby shorten its life or require frequent repair, aside from the additional first cost of manufacture and assembling. With the ordinary type of rocker side bearing, the permissible amount of travel of the anti-friction element has been restricted to a certain extent; the action of the rocker has not entirely simulated that of a true cylindrical roller and various other difficulties have been encountered in the successful operation of rocker bearings due to the tendency of the rocker to become displaced or off center. While various expedients have been employed to maintain rocking elements in proper relation with the retaining casings, such as tooth-engaging means between the rocker and casing, these expedients have not proven entirely successful for the reason that accumulations of cinders and other foreign matter occur which prevent the rocker from returning to its normal position under the influence of gravity. Consequently, when the rocker is held by any foreign substance in an off-center position, the rocker is prevented from moving the requisite distance when actuated to that side to which it has been held off center.

With the present invention, I combine all the advantages of the anti-friction cylindrical rollers with those of the gravity returned rockers and eliminate the former disadvantages of both the roller and rocker types of bearings. I also provide a bearing which comprises only two elements, the retaining casting or casing and the roller itself, the roller and casing being so conformed that the roller will be automatically self-centered after each actuation and cannot be displaced by jarring or otherwise beyond a predetermined limited amount, which limited amount will not militate against the successful actuation of the anti-friction element regardless of the direction in which it is operated.

Figure 2:
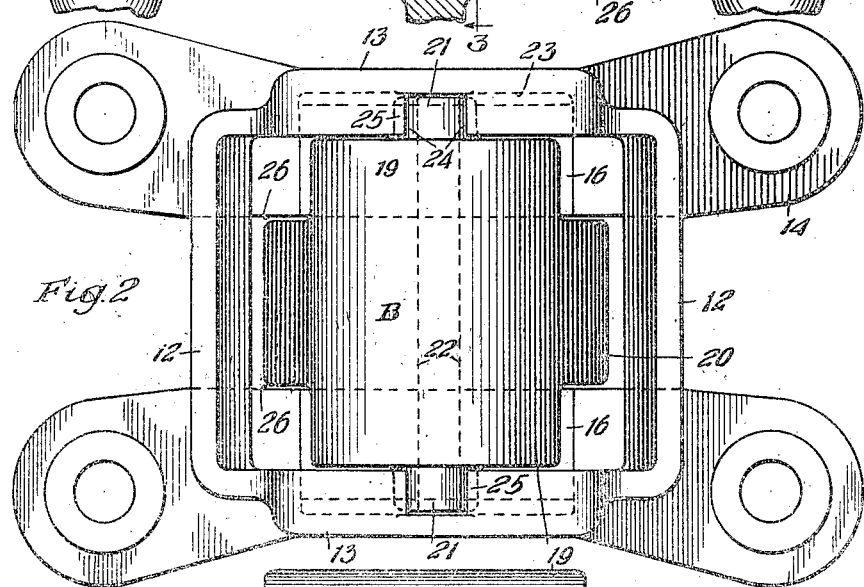
Figure 3:
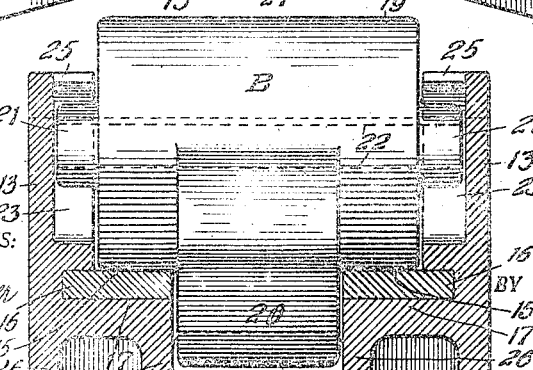

In the drawings forming a part of this specification, Figure 1 is a vertical, sectional view of portions of the body and truck bolsters of a car showing my invention embodied in an anti-friction bearing interposed therebetween and adapted to perform the functions of a side bearing. Fig. 2 is a top plan view of the bearing proper shown in Fig. 1. Fig. 3 is a vertical, sectional view taken substantially on the line 3—3 of Fig. 1. Fig. 4 is a part vertical, sectional view, part diagrammatic view, illustrating the position assumed by the anti-friction element when it is offset to the maximum permissible amount to the right, as viewed in Fig. 4, the dotted lines in said figure indicating the manner in which the various parts of the anti-friction element move when the anti-friction element is actuated to the right, as indicated by the arrow $a$. Fig. 5 is a view similar to Fig. 4 also illustrating the position of the anti-friction element when displaced the maximum permissible amount to the right, the dotted lines indicating the positions assumed by the anti-friction element when it is actuated to the left as indicated by the arrow $b$.

In said drawing and referring more particularly to Figs. 1, 2 and 3, 10 denotes the under portion of a body bolster of a car, and 11 the upper portion of a corresponding truck bolster. In the drawing, the side bearing is illustrated as secured to the truck bolster and, as shown, the side bearing comprises two elements, to-wit, a casing or retaining casting A, and an anti-friction element B.

The casing or casting A is shown of substantially rectangular hollow formation having end walls 12—12, side walls 13—13 and perforated ears or lugs 14—14 at the corners of the casing by which the latter is adapted to be riveted to the truck bolster. On its interior, the casing A is formed with a pair of parallelly arranged, horizontally extending, flat bearings as indicated at 15—15. In actual manufacture, these longitudinally extending bearings will preferably be provided by inserts 16—16 of suitable wear-resisting material, the inserts being supported by corresponding horizontal ledges 17—17 formed integrally in the casing A. At each end, the casing A is preferably cut away at the bottom as indicated at 18—18 so as to readily permit cinders or other foreign matter to escape or be washed out from the casing.

The anti-friction element B, as shown, comprises a true cylindrical section 19 and a normally depending eccentrically disposed, preferably integral weighted section 20. The element B, at the ends of the cylindrical section 19 thereof is formed with axially extended studs 21—21. The element B is cored as indicated at 22, in order to provide a casting easier to manufacture. The side walls 13 of the casing A are each recessed on their inner faces as indicated at 23 to accommodate the back and forth movements of the annular studs 21. Centrally of the side walls, the latter are open at the top as indicated at 24 in order to permit the insertion of the anti-friction element. The lips 25 on each side of each opening 24 are bendable so that, after the roller is in place, the lips 25 are bent inwardly to the position shown in Fig. 1 so as to restrict the width of the opening 24 and prevent accidental lifting out of the anti-friction element.

The eccentrically disposed weighted section 20, as clearly shown in Fig. 3, is located at the center, axially, of the anti-friction element B and, as clearly shown in Fig. 3, extends downwardly between the two horizontal bearing seats for the roller section 19. In actual practice, the thickness of the eccentrically disposed section 20 will be made slightly less than the distance between the walls 26—26 of the casing A so that said section 20 will effectively prevent twisting of the anti-friction element. The formation of the eccentric weighted section 20 is of extreme importance and, as shown, the periphery thereof is formed as follows. The lower portion of the periphery between the points C—C as indicated in Fig. 4, is formed on an arc concentric with the surface of the roller section 19. The upper portions of the periphery between the points $d$—$d$ on each side of the roller are struck on radii whose center is in the section line 3—3 of Fig. 1, preferably at the point indicated at $e$ in said figure. The length of this surface generating radius is made such that the surfaces $d$—$d$ will preferably intersect with the periphery of the roller section 19 at a point horizontally in line with the center of the roller 19 when the roller is in the position indicated in Fig. 1. The remaining portions of the periphery of the eccentric section 20, that is, those portions between the points $c$ and $d$ on each side as viewed in Fig. 4, are struck on relatively short radii, the centers of which are approximately indicated in Fig. 4 by the letters $f$—$f$. The reasons for the specific formation of the periphery hereinbefore described will more fully appear hereinafter.

Referring now to Fig. 1, the central normal position of the anti-friction element is shown in full lines and it will be noted that there is a comparatively small space between the extreme right and left hand portions of the eccentric section 20 and inwardly extending, transverse shoulders or ribs 27—27 on the end walls 12 of the casing A. These spaces are indicated by the references $g$—$g$ in Fig. 1 and in actual practice each of these spaces will approximate ⅛th of an inch. Each rib 27 has an inner relatively narrow vertical face indicated at 28 and then is inclined upwardly and outwardly as indicated at 29. With the anti-friction element B in the central normal position shown in full lines in Fig. 1, it will roll to either side of normal the full distance which, in actual practice where a roller 4″ long and 3″ in diameter is employed, will be 2¼″ to either side. The extreme position of the anti-friction element B is shown in dotted lines in Fig. 1, from which it will be noted that the depending eccentric section 20 readily clears the right hand rib 27 during the rolling movement and the anti-friction element is brought to rest by the roller section 19 thereof coming into contact with the left hand end wall 12, as the parts are viewed in Fig. 1. In this extreme position, it will be noted that the eccentric section 20 has no portion thereof elevated beyond the upper contacting surface of the roller section 19 but on the contrary, remains well below said point. Upon release of the actuating pressure or force, it is evident that the eccentric section 20 will operate, under the influence of gravity, to automatically roll the element B backward or in a reverse direction to its central normal position.

Due to the fact that the anti-friction element B is not controlled by any springs or other auxiliary means, it is evident that the same may be jarred or vibrated when not under pressure to a position off center. The maximum amount to which this displacement can occur is limited to one of the spaces $g$, or in actual practice, approximately ⅛th inch. Such a condition is shown in Fig. 4 by the full lines of the anti-friction element. In this extreme position, it will also be evident that the anti-friction element must be able to function properly when rolled in either direction. By forming the periphery of the eccentric section 20 as hereinbefore described in detail, when the roller is moved in the direction indicated by the arrow $a$ shown in Fig. 4, the peripheral surface of the eccentric section 20 will readily slide past the vertical portion 28 of the adjacent rib 27, the bodily movement of the element B to the right being compensated for by the gradually decreasing radius of the periphery of the eccentric section 20. The dotted position of the eccentric anti-friction element B in Fig. 4 represents this action when the element B has been moved a greater part of its distance toward the right and further rolling of the element B will be unimpeded since the portion of the periphery of the eccentric section 20 adjacent the rib 27 will move away from the rib 27 a slight distance farther.

Assuming the anti-friction element B displaced or offset the maximum amount to the right as shown by the full lines in Fig. 5, and the element rolled toward the left as viewed in Fig. 5, the eccentric section 20 of the element B will start moving away from the rib 27 as indicated by the dotted position of the element B in said figure.

With the construction shown and described, it is evident that upon maximum displacement of the element B from its central normal position before it is actuated, it will nevertheless function properly to an amount equal to that which it would move if started from the position shown by full lines in Fig. 1 less the amount to which it is offset. In other words, if the roller be 3″ in diameter and intended for a 2¼″ movement either side of center, the most unfavorable condition is represented in Fig. 4 and even in this condition, the roller would be permitted a movement of 2¼″ minus ⅛″. In this connection, it may be added that the scale of the drawing is approximately two-thirds of the actual device.

From the preceding description, it will be seen that the bearing which I have designed is extremely efficient; both parts may be readily manufactured at comparatively small expense in the form of castings; a minimum number of elements is employed, that is, a retaining casing and an anti-friction member; a true rolling action as distinguished from a rocking action is obtained; the anti-friction element is returned to normal position solely under the influence of gravity with complete elimination of any outside agency such as springs that have heretofore been customary; and the parts are so designed that the anti-friction element cannot accidentally, under service conditions, be displaced or jarred to an amount which in any way would prove detrimental to the operation of the bearing.

Although I have herein shown and described what I now consider the preferred manner of carrying out the invention, the same is merely illustrative and I contemplate all changes and modifications that come within the scope of the claims appended hereto.—

I claim:

1. In an anti-friction bearing of the character described, the combination with a hollow retaining member adapted to be secured to a bolster of a car and having a pair of parallelly arranged, spaced, horizontally and longitudinally extending bearing seats, of an anti-friction cylindrical roller having its ends adapted to roll along said seats, and an eccentrically disposed weight rigid with respect to said roller adapted to automatically return the latter to normal position after each actuation upon removal of the actuating pressure, the surface of said cylindrical roller being adapted to act as a bearing surface.

2. In an anti-friction bearing of the character described, the combination with a hollow retaining member adapted to be secured to a bolster of a car and provided with a pair of parallelly arranged, spaced, horizontally and longitudinally extending bearing seats, of an anti-friction cylindrical roller adapted to have its ends roll along said seats, said roller having an integrally formed eccentrically disposed weight normally positioned between said seats and adapted to return the roller to normal position after each actuation thereof upon removal of the actuating force, the surface of said cylindrical roller being adapted to act as a bearing surface.

3. In an anti-friction bearing of the character described, the combination with a hollow retaining member having bearing seats, and walls extending transversely of said seats, of an anti-friction element disposed within said member and adapted for rolling movement along said seats, said element having a weighted section, said weighted section being of such dimension, in a line extending between said transverse walls of the retaining member, as to leave a relatively small space between said weighted section and said transversely extending walls to thereby limit the amount of off-center to which the anti-friction element can be accidentally brought to rest free from pressure.

4. In an anti-friction bearing of the character described, the combination with a hollow retaining member having a pair of spaced, horizontally extending bearing seats on its interior, and upstanding side walls, the latter being provided on their inner sides with longitudinally extending recesses, of an anti-friction element adapted for rolling movement along said horizontal bearing seats, said element having an integral, normally depending eccentric weight, said element having also end extensions arranged to move within said recesses, said extensions of the element being insertible through vertical openings provided in the side walls of the retaining member and the latter having bendable lips adapted to restrict said vertical openings after the anti-friction element has been assembled with said member.

5. In an anti-friction bearing of the character described, the combination with a retaining member, of an anti-friction element, said member having a bearing seat horizontal throughout and on which said element bears and is adapted to roll to either side of normal position, said element having an eccentrically disposed weighted portion rigid with respect thereto, said weighted portion being elevated when the element is rolled from its normal position in either direction and thereby adapted to roll said element in a return direction upon removal of the actuating force, said member having means on opposite sides of the element extending parallel thereto and slightly spaced from said weighted portion on each side of the element when the latter is in central normal position, said means coöperating with said weighted portion to limit the amount of off-center at which said element may come to rest when free from actuating force.

6. In an anti-friction bearing of the character described, the combination with a retaining member, of an anti-friction cylindrical roller, said member having a bearing seat horizontal throughout and on which said roller bears and is adapted to roll to either side of normal, said roller having an integral eccentrically disposed weighted section, said section being elevated when the roller is moved from its normal position in either direction and thereby adapted to cause reverse rolling movement of the roller upon removal of the actuating force, said member having means on opposite sides of the roller extending parallel to the axis thereof and slightly spaced from said weighted section on each side of the roller when the latter is in central normal position, said means coöperating with said weighted section to limit the amount of off-center at which the roller may come to rest when free from actuating force.

7. In an anti-friction bearing of the character described, the combination with a retaining member, of an anti-friction element, said member having laterally spaced bearing seats horizontal throughout and on which said element bears at its ends and is adapted to roll to either side of normal, said element having an eccentrically disposed weighted portion rigid therewith, said weighted portion being elevated when said element is rolled from its normal position in either direction and thereby adapted to rotate said element in a reverse direction upon removal of the actuating force, said weighted portion normally extending between said bearing seats and adapted to prevent twisting of the element with respect to said member, said member having means on opposite sides of said element extending parallel thereto and slightly spaced from said weighted portion on each side of said element when the latter is in central normal position, said means coöperating with said weighted portion to limit the amount of off-center at which said element may come to rest when free from actuating force.

8. In an anti-friction bearing of the character described, the combination with a casing having a horizontal bearing seat, of an anti-friction element adapted to roll along said seat in either direction from normal, and coöperating means on said element and said casing adapted to limit the amount of off-center of said element when the latter is free from actuating pressure, the portion of said means on the anti-friction element being also adapted to return the element to normal position after actuation, under the influence of gravity.

9. In an anti-friction bearing adapted for railway cars, the combination with a casing adapted to be secured to a bolster, of an anti-friction cylindrical roller disposed within said casing, said casing being provided with a horizontally extendng flat bearng surface upon which said roller is adapted to roll in either direction from normal position, said casing having transversely extending interior shoulders at each end thereof on opposite sides of the roller, said roller having an integral eccentrically disposed weighted section, said weighted section having a periphery formed of curved surfaces of different radii, the maximum dimension of said section in a direction perpendicular to the axis of the roller being slightly less than the distance between said ribs and substantially in line therewith.

10. In an anti-friction bearing, the combination with a hollow substantially rectangular base casting having spaced, parallel flat bearing surfaces on either side thereof, said casting having end walls provided with interior transversely extending ribs, of an anti-friction cylindrical roller having its ends adapted to roll upon said seats, said roller being provided with an integral eccentric weighted section intermediate the ends thereof, said section normally depending between said seats, the maximum dimension of said eccentric section in a direction perpendicular to the axis of the roller being slightly less than the distance between said ribs and substantially in line therewith when the roller is in normal position, and coöperating means on the casting and roller to prevent accidental disengagement of the roller from the casting.

11. In an anti-friction bearing of the character described, the combination with a retaining member having a bearing seat, of an anti-friction element adapted to roll on said seat in either direction from normal, a combined centering and over-balancing projection rigid with respect to said element and projecting radially beyond the periphery thereof, and adapted to be elevated when said element is rolled to either side of normal, and means on said member coöperating with said projection to limit the amount of off-center of said element when the latter is free from actuating pressure.

12. In an anti-friction bearing of the character described, the combination with a retaining member having a bearing seat, of an anti-friction element adapted to roll on said seat in either direction from normal, a combined centering and over-balancing projection rigid with respect to said element and projecting radially beyond the periphery thereof, and adapted to be elevated when said element is rolled to either side of normal, and means on said member coöperating with said projection to limit the amount of off-center of said element when the latter is free from actuating pressure, said projection being disposed between the ends of said element.

13. In an anti-friction bearing of the character described, the combination with a retaining member having a flat horizontally extending bearing seat, of a cylindrical roller adapted to bear and roll on said seat in either direction from normal, means rigid with respect to said roller and eccentrically disposed outside of the surface thereof, and means on the retaining member coöperable with said first-named means to limit, to a predetermined amount, the bodily off-centering of said roller while free from actuating pressure.

14. In an anti-friction bearing of the character described, the combination with a hollow retaining member having upstanding end walls provided with oppositely inwardly and downwardly extending shoulders on the inner faces thereof, said member having also a longitudinally extending bearing seat, of an anti-friction element adapted to roll along said seat in either direction from normal, said element having a normally depending eccentric projection, the maximum width of said projection, taken transversely of the axis of said element, being slightly less than the minimum distance between said inclined shoulders of the retaining member and normally substantially in alinement therewith.

15. In an anti-friction bearing of the character described, the combination with a hollow retaining member adapted to be secured to a bolster and provided with a flat horizontally extending bearing seat, of an anti-friction element disposed within said member and having concentric upper and lower bearing surfaces, said element being adapted for rolling movement along said seat, said element being provided with an over-balance section, and coöperating means on said element and the retaining member for limiting the possible off-centering of said element when free from actuating pressure, said means also coöperating to guide and insure the return of said element to its normal central position upon removal of the actuating pressure.

In witness that I claim the foregoing I have hereunto subscribed my name this 6th day of Jan., 1919.

GEORGE A. JOHNSON.